United States Patent [19]

Moris

[11] Patent Number: 4,695,003

[45] Date of Patent: Sep. 22, 1987

[54] SELF ADJUSTING ENDLESS LOOP TAPE CARTRIDGE

[75] Inventor: Alfred H. Moris, St. Paul, Minn.

[73] Assignee: Minnesota Mining and Manufacturing Company, Saint Paul, Minn.

[21] Appl. No.: 877,374

[22] Filed: Jun. 23, 1986

[51] Int. Cl.⁴ ............................................. G11B 23/07
[52] U.S. Cl. ............................ 242/55.19 A; 242/71.8; 360/93
[58] Field of Search ...................... 242/55.18, 55.19 R, 242/55.19 A, 71.8; 360/93

[56] References Cited

U.S. PATENT DOCUMENTS

| | | | |
|---|---|---|---|
| 2,850,278 | 9/1958 | Simler | 242/55.19 R |
| 3,140,837 | 7/1964 | Cailliot | 242/55.19 A |
| 3,637,151 | 1/1972 | Skwarek et al. | 242/55.19 A |
| 4,293,882 | 10/1981 | Moris | 360/93 |
| 4,367,850 | 1/1983 | Moris | 242/55.19 A |
| 4,394,989 | 7/1983 | Moris | 242/55.19 A |
| 4,427,160 | 1/1984 | Myers | 242/55.19 A |

Primary Examiner—Billy S. Taylor
Attorney, Agent, or Firm—Donald M. Sell; James A. Smith; William L. Huebsch

[57] ABSTRACT

A cartridge including a cylindrical hub attached to a housing, which hub has a central opening and a slot extending axially across the width of the hub and communicating with the central opening, and an endless length of magnetic tape having a major portion wrapped about the hub to form a coil and a minor portion extending from the innermost wrap of the coil, through the slot and around the side surface of the coil to the outermost wrap of the coil. Means on the housing define a tape path for the minor tape portion including a spring biased guide pin that is moved by changing tension in the minor portion, and is connected to a cam which upon movement of the guide pin will move a portion of the hub to adjust the length of and thereby the tension in the minor tape portion.

1 Claim, 5 Drawing Figures

SELF ADJUSTING ENDLESS LOOP TAPE CARTRIDGE

TECHNICAL FIELD

The present invention relates to cartridges for use in magnetic recording and/or playback machines, which cartridges each include a length of magnetizable tape that is spliced into an endless loop; and in one important aspect to such cartridges used in the background music, foreground music and broadcast industries.

BACKGROUND ART

My U.S. Pat. No. 4,367,850 describes a cartridge including a length of magnetic tape spliced into an endless loop. In one embodiment that cartridge can be made to conform to the standard of the NAB so that it can be used in the types of record/playback machines presently in use in the broadcast industry. That cartridge embodiment causes much less edge wear on the tape and much less change in tension in the tape at a head of a machine in which the cartridge is received than the other types of cartridges presently in use in the broadcast industry.

The cartridge described in U.S. Pat. No. 4,367,850 employs a method for maintaining a uniform high tension in the tape at a head of a machine in which the cartridge is engaged so that the tape can be pressed against the head by tension alone without the use of pressure pads. That method comprises providing a fixed, generally cylindrical hub having a central opening and a slot extending axially across the full width of the hub and communicating with its central opening, and an endless length of magnetic tape; wrapping a major portion of the tape about the hub to form a coil while allowing a minor portion of the tape to extend from the innermost wrap of the coil through the slot into the central opening of the hub, and around the side surface of the coil to the outermost wrap of the coil; pulling the tape from the slot and across a head on a record/playback machine; and applying a light force to tension the minor portion of the tape as it moves onto the outer wrap of the coil which will produce the high, generally uniform tension in the minor portion of the tape being pulled from the coil and across the head.

The embodiment of the cartridge adapted for use in the broadcast industry which employs that method to tension tape across a head comprises a housing adapted to be received in a record/playback machine and having access openings adapted to receive record/playback heads and a tape drive mechanism in the machine. The hub is fixed on the housing at a position spaced from the access openings. Means on the housing define a tape path for, and produce tension in, the minor portion of the tape. Those means comprise means for guiding the minor portion of the tape past the access openings in a predetermined position for engagement by the heads and the drive mechanism of the playback machine, and a guide pin guiding the minor portion of the tape between the access openings and the outermost wrap of the coil. The guide pin is mounted for movement between a first position providing a first path length between the access openings and the outer wrap of the coil and a second position providing a second path length longer than the first path length between the access openings and the outer wrap of the coil (which means preferably is an arm having a first end supporting the guide pin, and a second end pivotably mounted on the housing to afford movement of the pin along an arcuate path adjacent the periphery of the coil between its first and second positions), and means are provided for biasing the guide pin toward its second position.

The pin can move to positions between its first and second positions under the influence of the biasing means to accommodate changes in length of the minor portion of the tape which decreases or increases respectively when the length of the major portion increases or decreases. The major portion of the tape cyclically undergoes its largest change in length by slowly decreasing in length as the splice moves from the coils outer wrap toward its inner wrap and by then suddenly increasing in length as the splice leaves the coil. The means for biasing the guide pin is adapted to apply a small force at the guide pin (e.g., generally in the range of 2 to 14 grams) to lightly tension the tape extending around the pin and moving onto the outermost wrap of the coil, somewhat in the manner of a rope or Proney brake, which light tension produces a significantly higher tension (e.g., generally in the range of 50 to 115 grams or 2 to 4 ounces) in tape leaving the coil. That higher tension is surprisingly uniform despite small changes in the force applied by the guide pin as the length of the minor portion of the tape changes due to the position of the splice along the tape.

The tape is guided so that the quite uniform higher tension thus produced in the minor portion of the tape between the inner wrap of the coil and the drive mechanism of a machine in which the cartridge is engaged presses the tape against the record and playback heads of the machine with sufficient pressure that pressure pads are not required, and the tape is thus not subjected to the abrasion and erratic forces caused by sliding contact between the tape and such pressure pads.

Also, my U.S. Pat. No. 4,394,989 describes a tape cartridge of the type described above in which the length of the minor portion of the tape can be easily adjusted by persons in the field to accommodate changes in the cartridge such as tape wear to ensure that a desired range of guide pin movement will be retained.

In that improved cartridge, the hub comprises a flexible arcuate cantilevered portion having a first end partially defining the slot, a second end that is fixed on the housing, and which is separated from the housing between its ends. Means in the form of a cam rotatably mounted on the housing is provided for changing the position of the cantilevered hub portion radially of the rest of the hub to adjust the effective diameter of the hub and thereby the length of the minor portion of the tape to cause the guide pin to move within a desired range of movement between its first and second positions. The cam has a peripheral surface contacting the inner side of the cantilevered hub portion, and can be manually rotated with a tool such as a screwdriver as the tape is being propelled by a machine so that the effects of cam adjustments on the tape can be observed as they are made. Such adjustability ensures that changes in overall tape length which can occur due to causes such as tape wear can be compensated for. While such adjustments do not need to be made often during the life of a cartridge, they do require attention by technicians, such as each time the tape is re-recorded.

Thus the cartridge described in my U.S. Pat. No. 4,394,989 is not particularly useful in cartridges used in background or foreground music machines where users typically are not trained to or interested in making the occasional cam adjustments needed to maintain the cartridge in its best operating condition.

Another problem that occurs with the cartridge described in U.S. Pat. No. 4,394,989 is that when it is moved from a room at normal temperatures into the cold (e.g., from an area at about 68° F. to an area at below 10° F.) its coil and fixed hub will shrink. When the cartridge is then again brought into a warm room and playing of the cartridge is attempted, its tape coil will seize around the hub which is more exposed and returns to room temperature and thus expands to its original size more quickly than the tape coil. Radio technicians can correct for this problem by adjusting the cam to release the tension in the coil. Again, however, persons involved with background music or foreground machines typically lack the training and desire to perform similar adjustments.

DISCLOSURE OF THE INVENTION

The present invention provides a tape cartridge of the type described above in which the length of the minor portion of the tape and the tension in the tape are automatically adjusted during use of the tape cartridge to accommodate changes in the cartridge such as tape wear, and which automatically makes adjustments to allow movement of a cold coil seized around a rewarmed hub to correct the problem described above.

According to the present invention, there is provided a cartridge comprising a housing adapted to be received in a machine (such as a background or foreground music machine or a machine used in the broadcast industry), which housing has access openings adapted to receive heads and a tape drive mechanism in the machine. The cartridge includes a cylindrical hub fixed to the housing at a position spaced from the access openings, the hub having a central opening and a slot extending axially across the full width of the hub and communicating with the central opening, and an endless length of tape having a major portion wrapped about the hub to form a coil and a minor portion extending from the innermost wrap of the coil through the slot into the central opening, and around the side surface of the coil to the outermost wrap of the coil.

The hub comprises a flexible cantilevered portion having a first end partially defining the slot, having a second end spaced from the first end that is fixed on the housing, which cantilevered portion is separated from the housing between the first and second ends; and the cartridge comprises a cam rotatably mounted on the housing and having a peripheral surface contacting the inner side of the cantilevered hub portion to provide means for changing the position of the cantilevered portion radially of the hub to adjust the effective circumference of the hub and thereby the length of the minor portion of the tape.

Means are also provided for defining a tape path for and producing a generally uniform tension in the minor portion comprising a guide pin helping to guide the minor portion at a position adjacent the slot, and means on the housing for guiding the minor portion past the access openings in a predetermined position for engagement by the heads and drive mechanism of the playback machine. The guide pin is mounted on an arm fixed to the cam and pivotal about the axis of the cam for movement between a first position providing a first path length for the minor portion of the tape at which the cam provides a first maximum effective circumference for the hub and a second position providing a second path length shorter than the first path length for the minor portion of the tape at which the cam provides a second minimum effective circumference for the hub. Also, means in the form of a spring is provided for biasing the guide pin toward its first position.

With this arrangement, tension in the minor portion of the tape between the coil and the drive mechanism of the playback machine caused by the drive mechanism pulling the tape against resistance caused by the rotating coil (which resistance is largely influenced by tension in tape moving onto the outer wrap of the coil) will hold the guide pin against the biasing force of the spring. If the tension in the tape at the guide pin increases, it will move the guide pin toward its second position, and thereby move the cam to decrease the effective circumference of the hub while decreasing the path of for minor portion of the tape so that tension in the tape moving onto the outer wrap of the coil decreases, and thus the tension in tape being pulled from the coil is also decreased until equilibrium is reached. Conversely, if the tension in the tape at the guide pin decreases, the spring will move the guide pin toward its first position, and thereby move the cam to increase the effective circumference of the hub while decreasing the path length for the minor portion of the tape so that tension in the tape moving onto the outer wrap of the coil increases, and thus the tension in tape being pulled from the coil is also increased until equilibrium is again reached. The result will be a generally uniform tension in the minor portion of the tape at the periphery of the coil that produces an acceptably uniform tension in tape being pulled from the coil and across the heads for a background or foreground music machine (though not so uniform as is often desired in the broadcast industry and is produced by the cartridge described in U.S. Pat. No. 4,394,989). Such generally uniform tension will be maintained during the useful life of the cartridge despite substantial tape wear. Also, if a cartridge with a cold coil cinched about a rewarmed and expanded hub is played on a machine, movement of the guide pin and cam can significantly reduce the effective circumference of the hub to allow the coil to rotate, thereby automatically correcting the problem described above.

BRIEF DESCRIPTION OF THE DRAWING

The invention will be further described with reference to the accompanying drawing wherein like numbers refer to like parts in the several views, and wherein.

DETAILED DESCRIPTION

Figure 1:
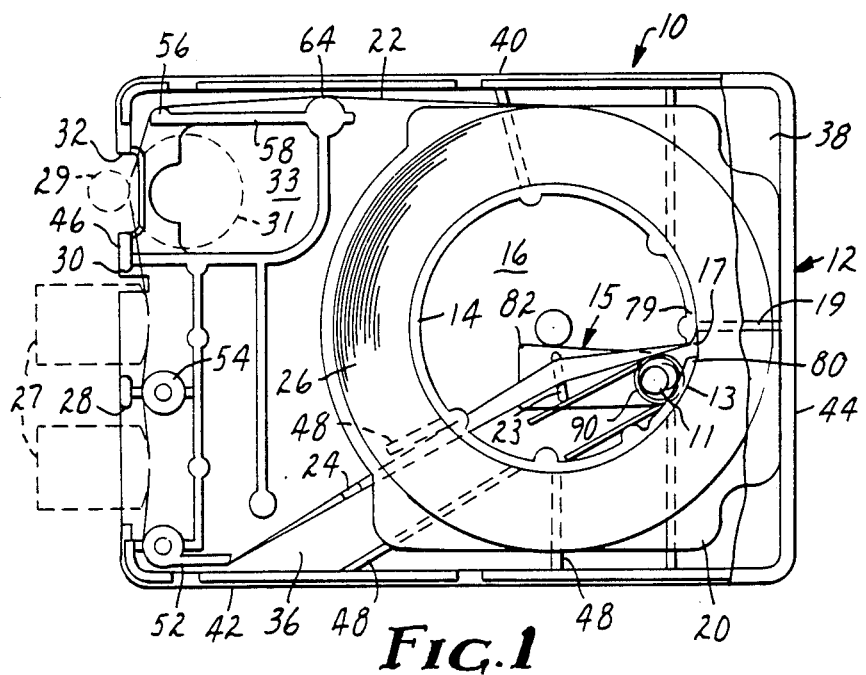
FIG. 1 is a horizontal plan view of a tape cartridge according to the present invention having parts broken away to shown details.

Referring now to the drawing there is shown a cartridge 10 according to the present invention. Except for the addition in the cartridge 10 of a self adjusting cam and guide pin assembly 15 including a cam 11 for adjusting the location of a cantilevered portion 13 of a hub 14 radially of the rest of the hub 14 and a guide pin 23 that helps to guide and by moving the cam 11 automatically adjusts the length of and thereby the tension in a minor portion of an endless loop of strip material or magnetizable tape 22 extending between the inner and outer wrap of a coil 26 of the tape 22 on the hub 14, and (2) the deletion of a guide pin assembly that tensioned and guided the minor portion of the endless loop onto the coil 26 in the cartridge described in U.S. Pat. No. 4,394,989, the cartridge 10 has essentially the same structure as the cartridge described in my U.S. Pat. No. 4,394,989 (the content whereof is incorporated herein by reference).

Figure 4:
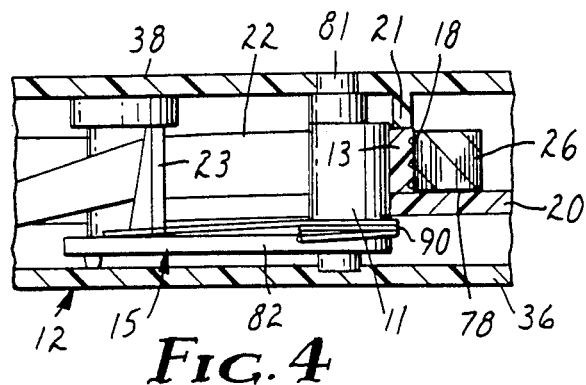
FIG. 4 is a sectional view taken approximately along line 4—4 of FIG. 2.
Figure 5:
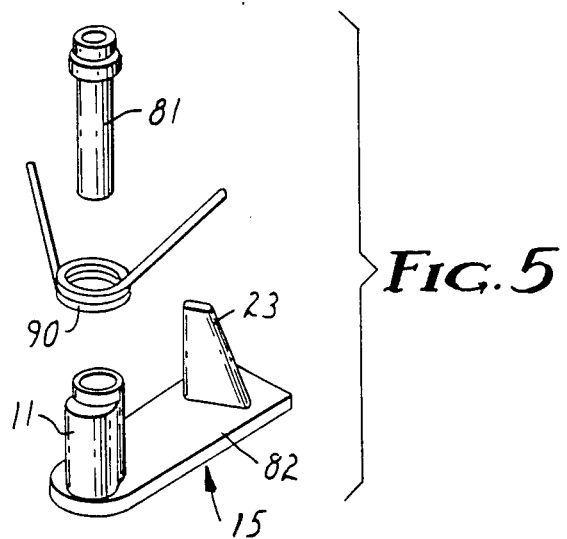
FIG. 5 is a fragmentary enlarged exploded perspective view of the self adjusting cam and guide pin assembly in the tape cartridge of FIG. 1.

The cartridge 10 illustrated herein includes a two-piece molded housing 12, the annular hub 14 which is fixed in the housing 12 and has a central opening 16 and a slot 17 communicating between the central opening 16 and a peripheral surface of the hub 14 defined by annular, axially spaced ribs 18 (FIG. 4), and a bottom flange 20 extending radially outwardly from one edge of the hub 14. The cartridge 10 has no upper flange for the hub 14, but provides the function of such an upper flange by including a plurality of ridges 19 oriented radially of the hub 14 and joined at their inner ends by an annular ridge 21, which ridges 19 and 21 depend from and are integrally molded with a top wall 38 of the housing 12.

The endless loop of tape 22 has a major portion wound in the coil 26 about the hub 14, and a minor portion extending from the innermost wrap of the coil 26 through the slot 17, around the guide pin 23 on the guide pin assembly 15, and along means for defining a tape path for the minor portion of the tape past access openings 28, 30, 32 and 33 in the cartridge housing 12 (which access openings 28, 30, 32 and 33 are adapted to receive heads 27 and a capstan 29 and a pinch roller 31 of a tape machine drive mechanism shown in dotted outline in FIG. 1) to the outermost wrap of the coil 26.

The two-piece housing 12 is generally rectangular and comprises a bottom wall 36 in which the access opening is formed, the top wall 38 which is transparent, opposite side walls 40 and 42, a rear wall 44 and a front wall 46 in which the access openings 28, 30 and 32 are formed. The outer shape of the housing 12, the positioning and shape of the access openings 28, 30, 32 and 33, and the location of the tape path past the access openings 28, 30, 32 and 33 are all in accordance with the "NAB Standard, Cartridge Tape Recording and Reproducing" which is published by the National Association of Broadcasters, 1771 N Street N.W., Washington, D.C. 20036, the content whereof is incorporated herein by reference.

The means for defining the tape path for the tape 22 past the access openings 28, 30, 32 and 33 comprises the guide pin 23 on the guide pin assembly 15 and bosses 48 projecting from the inner surface of the bottom wall 36. The bosses 48 fixedly support the hub 14 and bottom flange 20 and space the bottom flange 20 from the bottom wall 36 so that tape 22 exiting from the slot 17 and passing over the guide pin will twist about 90 degrees as it passes across the opening 16, will pass with one of its major surfaces against the outer surface of the lower flange 20 between the bottom flange 20 and the bottom wall 36, and will then twist back to its original orientation and pass onto a projecting portion of a guide 52 and around a generally cylindrical portion of the guide 52. The guide 52 is fixed on and projects from the bottom wall 36 of the housing 12, and has concave side surfaces facing the side and front walls 42 and 46, around which side surfaces the tape changes direction to move parallel to the front wall 46 and across the openings 28, 30 and 32. A second generally cylindrical guide 54 is fixed on and projects from the bottom wall 36 and also has a concave surface facing the front wall 46. The guides 54 and 52 position the tape at a predetermined position axially along the guides 52 and 54 between the top and bottom walls 38 and 36 and with respect to the openings 28, 30 and 32 (and thereby along heads 27 positioned in the openings 28 and 30) by centering the tape across their concave side surfaces, which centering effect is known in the art. An upstanding arcuate wall 56 guides the tape through a 90 degree arc along the side wall 40 in a channel between the side wall 40 and a portion 58 of an adjacent wall which surrounds the access opening 33 in the bottom wall 36, and along wall edge surface 64 at the end of the wall portion 58 opposite the front wall 46 to the outer wrap of the coil 26.

As is taught in my U.S. Pat. No. 4,293,882, the ribs 18 defining the periphery of the hub 14 restrict the force required to pull the tape 22 from the innermost wrap of the coil 26 by not only reducing friction between the fixed hub 14 and the innermost wrap on the coil 26, but also reducing friction between all the wraps of the coil 26 which must slide relative to each other as the coil 26 rotates. Also the radius of the generally cylindrical hub 14 at its periphery defined by the ribs 18 preferably decreases slightly (e.g., by about 0.05 cm for a hub 14 with about a 2.7 cm average radius) around the hub 14 in the direction the coil 26 rotates from an edge of the slot defined by a first end 80 of the cantilevered portion 13 of the hub 14 to a radiused edge of the slot 17 over which the inner wrap of tape bends as it exits the coil 26, which decreasing radius surprisingly decreases surging in the tension caused by the wrap of the tape 22 in the coil 26 moving relative to each other.

A graphite lubricated polymeric sheet 78 (FIG. 4), which may be made from the same materials the tape 22, can be positioned between the bottom flange 20 and the lower side surface of the coil 26. This sheet 78 appears to restrict cinching of the wraps of the tape 22 in the coil 26 about the hub 14 during rapid acceleration of the coil 26, apparently by providing a measure of tracking engagement with the edges of the wraps of tape in the coil 26 to retain their original diameter during such acceleration.

Figures 2, 3:
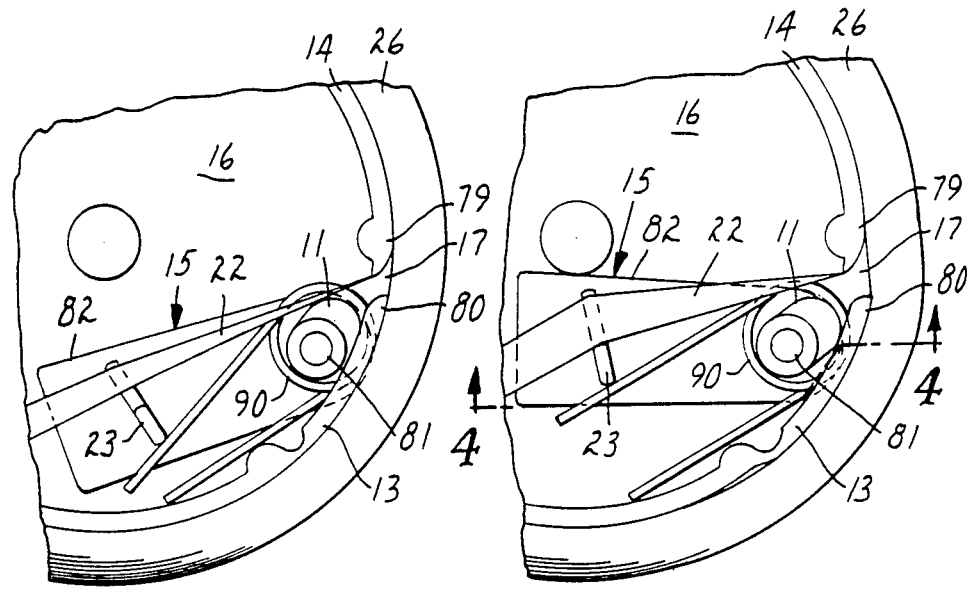
FIG. 2 is an enlarged fragmentary view showing a self adjusting cam and guide pin assembly in a first position.
FIG. 3 is an enlarged fragmentary view similar to FIG. 2 but showing the self adjusting cam and guide pin assembly in a second position.

The self adjusting cam and guide pin assembly 15 and its operation are best seen in FIGS. 2 and 3. The cantilevered portion 13 of the hub 14 has a second end 79 that is fixed on the housing 12 opposite its first end 80 that defines one side of the slot 17. The cantilevered hub portion 13 is separated from the housing 12 between its first and second ends 80 and 79, and is resiliently flexible. The cam 11 included in the cam and guide pin assembly 15 has a peripheral surface which contacts the inner surface of the cantilevered hub portion 13, and has portions at progressively increasing distances from the axis about which the cam 11 is rotatably mounted on the housing 12 by a pin 81, and thus can be rotated to move the cantilevered hub portion 13 outward or allow it to retract radially of the hub 14 to adjust the effective circumference of the hub 14 and thereby the diameter of the coil 26. Because of the multiplying effect of the many wraps of tape in the coil 26, even small movements of the cantilevered hub portion 13 will make significant changes in the minor length of the tape (e.g., for about 86 meters or 282 feet of tape wrapped about 392 times in the coil 26, an outward movement of 0.076 mm or 0.003 inch of the cantilevered hub portion 13 at the cam 11 will cause a change of about 25.4 mm or 1 inch in the length of the minor tape portion). An arm 82 is fixed to the cam 11, projects radially outwardly of the axis of the cam 11, and supports the upstanding guide pin 23 at its distal end. The guide pin 23 is thus rotatable about the axis of the cam 11 for movement between a first position (FIGS. 1 and 2) providing a first path length for the minor portion of the tape 22 at which the cam 11 provides a first maximum effective circumference for the hub 14; and a second position (FIG. 3) providing a second path length shorter than the first path length for the minor portion of the tape 22 at which the cam 11 is positioned to provide a second minimum effective circumference for the hub 14. A spring 90 between the housing 12 and the cam and guide pin assembly 15 provides means for biasing the guide pin 23 toward its first position.

During use of the cartridge 10 on a machine (e.g., a background or foreground music machine or a machine used in the broadcast industry), the capstan 29 and pinch roller 31 of the machine pull tape 22 through the slot 17 in the hub 14 from the innermost wrap of the coil 26, across the guide pin 23, and past the heads 27 on the machine which are positioned in the access openings 28 and 30. After leaving the nip between the capstan 29 and the pinch roller 31 tape moves along the arcuate wall 56 and edge wall surface 64 onto the coil 26 as its outermost wrap. Tension in the minor portion of the tape 22 between the coil 26 and the drive mechanism of the machine caused by the drive mechanism pulling the tape 22 against resistance caused by the rotating coil 26 (which resistance is largely influenced by tension in tape 22 moving onto the outer wrap of the coil 26) will hold the guide pin 23 against the biasing force of the spring 90. If the tension in the tape 22 at the guide pin 23 increases, it will move the guide pin 23 toward its second position, and thereby move the cam 11 to decrease the effective circumference of the hub 14 while decreasing the path for the minor portion of the tape 22 so that tension in the tape 22 moving onto the outer wrap of the coil 26 decreases, and thus the tension in tape 22 being pulled from the coil 26 is also decreased until equilibrium is reached. Conversely, if the tension in the tape 22 at the guide pin 23 decreases, the spring 90 will move the guide pin 23 toward its first position, and thereby move the cam 11 to increase the effective circumference of the hub 14 while decreasing the path length for the minor portion of the tape 22 so that tension in the tape 22 moving onto the outer wrap of the coil 26 increases, and thus the tension in tape 22 being pulled from the coil 26 is also increased until equilibrium is again reached. The result will be a generally uniform tension in the minor portion of the tape 22 at the periphery of the coil 26 that produces an acceptably uniform tension in tape 22 being pulled from the coil 26 and across the heads for a background or foreground music machine (though not so uniform as is produced by the cartridge described in U.S. Pat. No. 4,394,989). Such generally uniform tension will be maintained during the useful life of the cartridge 10 despite substantial tape wear. Also, if a cartridge 10 with a cold coil 26 cinched about a rewarmed and expanded hub 14 is played on a machine, movement of the guide pin 23 and cam 11 can significantly reduce the effective circumference of the hub 14 to allow the coil 26 to rotate, thereby automatically correcting the problem.

The present invention has now been described with reference to one embodiment thereof. It will be apparent to those skilled in the art that many changes can be made in the embodiment described without departing from the scope of the present invention. Thus the scope of the present invention should not be limited to the structures described in this application, but only by structures described by the language of the claims and the equivalents of those structures.

I claim:

1. A cartridge comprising:
   a housing adapted to be received in a machine and having access openings adapted to receive heads and a tape drive mechanism in said machine;
   a cylindrical hub attached to said housing at a position spaced from said access openings, said hub having a central opening and a slot extending axially across the full width of the hub and communicating with said central opening; and
   an endless length of tape having a major portion wrapped about said hub to form a coil and a minor portion extending from the innermost wrap of the coil through said slot into said central opening, and around the side surface of the coil to the outermost wrap of the coil;
   said hub comprises a flexible cantilevered portion having a first end partially defining said slot, having a second end spaced from said first end that is fixed on said housing, and being separated from said housing between said first and second ends;
   said cartridge comprises a cam rotatably mounted about an axis on said housing and having a peripheral surface contacting the inner side of said cantilevered hub portion to provide means for changing the position of said cantilevered portion radially of said hub to adjust the effective circumference of the hub and thereby the length of said minor portion; and
   means on said housing for defining a tape path for and producing tension in said minor portion, comprising means for guiding said minor portion past said access openings in a predetermined position for engagement by the heads and drive mechanism of the playback machine, and a guide pin helping to guide said minor portion at a position adjacent the slot, said guide pin being fixed to said cam for pivotal movement about the axis of said cam between a first position providing a first path length for said minor portion at which said cam provides a first maximum effective circumference for said hub and a second position providing a second path length shorter than said first path length for said minor portion at which the cam provides a second minimum circumference for said hub, and means for biasing said guide pin toward said first position.

* * * * *